(12) United States Patent
Sullivan

(10) Patent No.: US 7,363,358 B2
(45) Date of Patent: Apr. 22, 2008

(54) TRANSPORTING A WAN CONFIGURATION FROM A PC TO A RESIDENTIAL GATEWAY

(75) Inventor: Gary E. Sullivan, Trabuco Canyon, CA (US)

(73) Assignee: Gateway Inc., Irvine, CA (US)

( * ) Notice: Subject to any disclaimer, the term of this patent is extended or adjusted under 35 U.S.C. 154(b) by 663 days.

(21) Appl. No.: 10/142,097

(22) Filed: May 9, 2002

(65) Prior Publication Data

US 2003/0212773 A1 Nov. 13, 2003

(51) Int. Cl.
*G06F 15/177* (2006.01)
*G06F 15/16* (2006.01)

(52) U.S. Cl. .................. 709/222; 709/219; 709/237

(58) Field of Classification Search ........ 709/220–228, 709/217–219, 230–237; 370/244
See application file for complete search history.

(56) References Cited

U.S. PATENT DOCUMENTS

| | | | | |
|---|---|---|---|---|
| 5,671,355 A * | 9/1997 | Collins ........................ | 709/250 |
| 5,819,042 A * | 10/1998 | Hansen ........................ | 709/222 |
| 5,852,722 A * | 12/1998 | Hamilton ..................... | 709/221 |
| 6,041,356 A * | 3/2000 | Mohammed ................. | 709/227 |
| 6,070,187 A * | 5/2000 | Subramaniam et al. ..... | 709/220 |
| 6,195,693 B1 * | 2/2001 | Berry et al. ................. | 709/219 |
| 6,195,706 B1 | 2/2001 | Scott ........................... | 709/245 |
| 6,219,409 B1 | 4/2001 | Smith et al. ............ | 379/106.09 |
| 6,286,038 B1 * | 9/2001 | Reichmeyer et al. ....... | 709/220 |
| 6,286,039 B1 | 9/2001 | Van Horne et al. ......... | 709/221 |
| 6,289,377 B1 | 9/2001 | Lalwaney et al. .......... | 709/222 |
| 6,314,459 B1 * | 11/2001 | Freeman ..................... | 709/220 |
| 6,434,120 B1 * | 8/2002 | Natarajan et al. ........... | 370/255 |
| 6,560,642 B1 * | 5/2003 | Nurmann .................... | 709/220 |
| 6,636,505 B1 * | 10/2003 | Wang et al. ................. | 370/352 |
| 6,768,749 B1 * | 7/2004 | Osler et al. ................. | 370/524 |
| 6,829,238 B2 * | 12/2004 | Tokuyo et al. .............. | 370/392 |
| 6,958,996 B2 * | 10/2005 | Xiong ......................... | 370/389 |
| 6,963,908 B1 * | 11/2005 | Lynch et al. ................ | 709/220 |

(Continued)

FOREIGN PATENT DOCUMENTS

EP 1017206 A2 7/2000

(Continued)

OTHER PUBLICATIONS

Litt, S; Steve Litt's Perls of Wisdom: Perl Hash Reference Example; © 2000, http://www.troubleshooters.com/codecorn/littperl/perlhashexamps.htm.*

(Continued)

*Primary Examiner*—Joseph E Avellino
(74) *Attorney, Agent, or Firm*—Ross F. Hunt, Jr.; Jeffrey A. Haeberlin; Stites & Harbison PLLC

(57) ABSTRACT

A method, system, and computer program enabling a client device to transfer a network configuration from a broadband modem to a residential gateway in a simple, user friendly process. This provides a simple installation procedure for a user. A different network switch such as a router, bridge, or brouter may be used instead of a residential gateway. The method may be implemented through a single command or single small set of user commands, such as through a pull down menu or an icon on the graphical user interface.

14 Claims, 3 Drawing Sheets

U.S. PATENT DOCUMENTS

| | | | |
|---|---|---|---|
| 7,239,643 B2* | 7/2007 | Yoshida et al. | 370/401 |
| 2001/0030950 A1 | 10/2001 | Chen et al. | |
| 2001/0052025 A1* | 12/2001 | Maeda | 709/238 |
| 2002/0007407 A1* | 1/2002 | Klein | 709/225 |
| 2002/0065941 A1* | 5/2002 | Kaan et al. | 709/249 |
| 2002/0099804 A1* | 7/2002 | O'Connor et al. | 709/220 |
| 2002/0133578 A1* | 9/2002 | Wu | 709/222 |
| 2002/0152285 A1* | 10/2002 | Wheeler et al. | 709/218 |
| 2002/0163891 A1* | 11/2002 | Natarajan et al. | 370/254 |
| 2003/0051008 A1* | 3/2003 | Gorthy et al. | 709/220 |
| 2003/0097426 A1* | 5/2003 | Parry | 709/220 |
| 2003/0101243 A1* | 5/2003 | Donahue et al. | 709/220 |
| 2003/0126248 A1* | 7/2003 | Chambers | 709/223 |
| 2003/0140132 A1* | 7/2003 | Champagne et al. | 709/223 |
| 2005/0120135 A1* | 6/2005 | Molnar et al. | 709/242 |

FOREIGN PATENT DOCUMENTS

| | | |
|---|---|---|
| EP | 1133120 A2 | 9/2001 |
| JP | 2000-022732 | 2/2000 |
| JP | 2000-083066 | 3/2000 |
| JP | 2000-148637 | 5/2000 |

OTHER PUBLICATIONS

"ifconfig Command"; AIX Version 4.3: Commands reference, vol. 3; © Oct. 1997.* http://www.dlink.com/products/wireless/dw11000ap/, 2002.

http://www.dlink.com/products/broadband/di701/, 2002.

http://www.dlink.com/products/broadband/di711/, 2002.

http://www.2wire.com/products/instal.html, 2002.

http://www.apple.com/airport/specs.html, 2002.

* cited by examiner

TRANSPORTING A WAN CONFIGURATION FROM A PC TO A RESIDENTIAL GATEWAY

FIELD OF THE INVENTION

This invention generally relates to the field of network communications, and specifically, to a method for transporting a WAN configuration from a PC to a residential gateway.

BACKGROUND OF THE INVENTION

There are a variety of network switch devices. A gateway is a communications device which manages the flow of information between two networks. A wireless gateway is a device that connects broadband access to a local wireless network. An access point, the wireless equivalent of a hub, is a means of entry into a controlled security area, consisting of a card reader, monitor switches and/or latches, and is wired to an access control panel. A router is a device that connects networks and forwards through packet data. A bridge is a protocol independent switch between two networks. A brouter is a device that functions as both a bridge and a router.

Currently, configuration settings, including specifying different profiles, network names, and encryption settings, are performed on a PC-by-PC (personal computer) basis. One case where configuration settings need to be transferred is when the PC changes from a direct hook up to a network to a hookup through a network switching device. Using a network switching device offers a number of advantages, including better resource management and thwarting hacker attacks.

In the past, users, who had an existing PC connected to a broadband modem and then bought a residential gateway (network router) to share the Internet connection, often had to manually program the router with the same ISP (Internet Service Provider) settings as the broadband provider originally set up on the PC. These ISP settings included values like host name, domain name, IP address settings, etc. Written documentation of the required customer-specific settings from the ISP was often confusing.

Other prior art solutions involving a more user friendly approach have been tried. One involved, to a limited degree, the MAC address "clone" feature found on the user interface of some network routers. This feature reads the MAC address of the PC on which it is running, and then programs the same MAC address on the routers WAN-side NIC (wide area network) (network interface card). These settings are always a user-option, actually typically hidden from the user in an advanced section. Another, the D-Link DI-701 Residential Gateway, provides a graphical user interface for transferring the Internet settings of the computer previously attached to the broadband modem to the residential gateway. Yet another, the 2Wire HomePortal Residential Gateway, is pre-configured to work with a variety of broadband service providers, has an integrated broadband modem within the gateway, and may be configured for access to the Internet by entering one unique code.

However, none of the prior art discloses a method for automatically gathering the WAN configuration or other network configuration of the PC previously attached to the broadband modem or otherwise directly connected to the WAN or other network and programming the WAN configuration or other network configuration onto the residential gateway or network switch.

Therefore, it would be desirable to provide a means to simply and transparently transfer the network configuration settings from a PC to its corresponding network switch, such as a residential gateway.

SUMMARY OF THE INVENTION

The present invention provides a method and system for transparently converting a PC from direct modem communications set up with a network to buffering the PC through a network switch. The entire installation process may be accomplished by a handful of commands or a single command.

In a first aspect of the present invention, a method of replacing a modem of a client device with a network switch for network communications is disclosed which includes the steps of establishing a communication connection between the personal computer and the network switch through network communications and automatically transferring all network configuration settings of the client device to the network switch. The client device either responds to a query generated by the network switch or responds to a single user input prompt command made from a user interface of the client device to accomplish the step of automatically transferring all network configurations settings of the client device to the network switch.

In a second aspect of the present invention, a system is disclosed for allowing a user to replace a direct connection of a client device with a network switch for network communications with a connection through a network switch, which includes a personal computer which comprises a monitor having a screen which is capable of displaying a graphical user interface, a processor, and a network switch coupled to the processor of the personal computer. The user transmits the entire network configuration settings through either a single command or a small handful of commands.

In a third aspect of the present invention, a computer program of machine readable instructions is disclosed which comprises code to perform the following steps of establishing a communication connection between the client device and the network switch through network communications and automatically transferring all network configuration settings of the client device to the network switch. The client device either responds to a query generated by the network switch or responds to a single user input prompt command made from a user interface of the client device to accomplish the step of automatically transferring all network configurations settings of the client device to the network switch.

In a fourth aspect of the present invention, a residential gateway is disclosed for connecting one or more personal computers to a network which includes an enclosure having a processor, a memory, and one or more ports, located on the enclosure, each of the one or more ports adapted for connecting a single personal computer to the residential gateway, and a network port, located on the enclosure, for connecting to a network. The residential gateway is loaded with a software program which allows a user on the personal computer to transmit the personal computer's entire network configuration settings through a single command.

The present invention provides a method to automatically clone the complete WAN or other network configuration of a PC so that a user does not need to know or manually provide various parameters which may include the host name, the domain name, a particular IP address, or a particular MAC address for the user's PC.

The present invention is different from other clone features in that it gathers a set of parameters from the PC that might contribute to a successful installation, and applies all of them to the router or other network switching device without exposing any of the details to the user. The user interface might just ask a question "was this PC previously connected to your cable modem?" and then apply the settings automatically.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
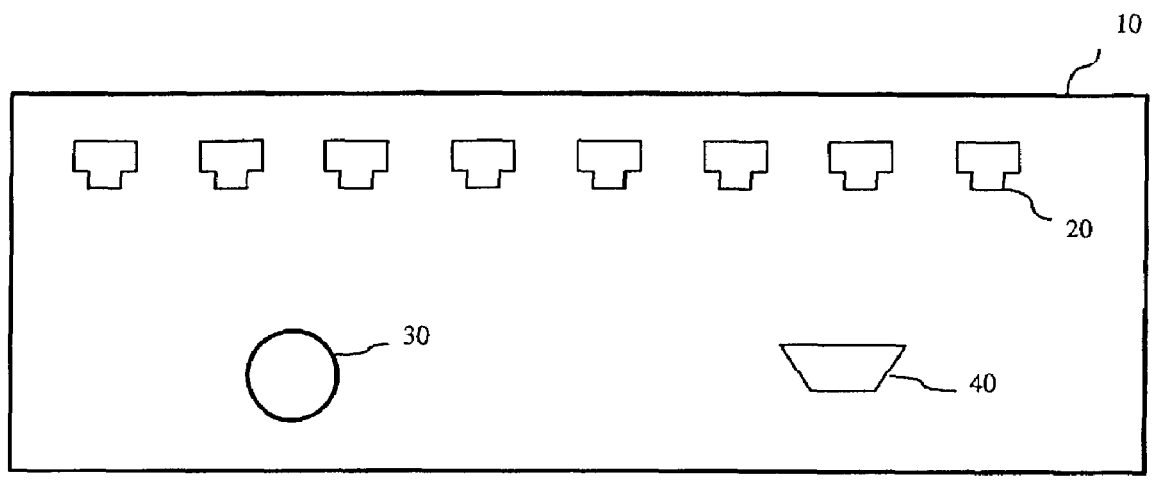
FIG. 1 illustrates a panel of a residential gateway of the present invention.

Reference will now be made in detail to the presently preferred embodiments of the invention, examples of which are illustrated in the accompanying drawings.

Referring generally now to FIGS. 1 through 4, exemplary embodiments of the present invention are shown.

The present invention relates to a method of allowing a user to simply switch a PC from a direct connection to a network to a connection through a network switching device. In one embodiment, a function is provided that a customer may use to automatically clone the complete WAN configuration of a PC that had previously been attached to a broadband modem and is now behind a residential gateway. This involves an executable program that runs on the PC which gathers the information and automatically programs the residential gateway with the same values. The programming action may be a single, self-synchronized algorithm that first programs the RG or access point, then checks to make sure that the connection has been maintained. Instead of a residential gateway, any common network switching device may be used, such as a router, a bridge, a brouter, or the like.

The network switches, such as a residential gateway may support a variety of functions such as virtual DMZ host, hacker detection, network address translation, firewall protection, client filtering, special application access, and connection support.

Certain assumptions may be made regarding the hardware and software. There is a minimum of one client PC and a residential gateway that provides access to a network such as the Internet. The client setup wizard may configure networking on all added PCs to the network and support legacy PCs such as with a networking kit (e.g., USB wireless). The client setup wizard may assume that the residential gateway is a RG or an XP-based RG PC. Various peripheral devices may be networked directly or may be connected to the client PC. As for software, the client PCs may use an operation system such as Windows, including Windows 98, 98SE, ME, 2000, and XP. An AOL client may be installed on one or more client PCs.

The present invention may be implemented through a single CD, diskette, or other removable medium which contains a single installation program that installs both the setup wizards and the network console. The integrated software program may reside in its entirety on the PC.

The user may connect the RG (residential gateway) and wire the network prior to running a setup wizard. A single screen may be used to present only a single question or parameter setting or a very small set of closely related settings. If the software detects that an RG is present, and that it has not been configured, the RG setup wizard is automatically run or an option menu appears before the user.

The residential gateway setup wizard may define and enforce a defined default network configuration that is safe and simple for the customer and that will support add on features that may be transparent to the user. It may limit user options to what is only absolutely necessary and minimal. It may combine all required options into a sequence of residential gateway setup wizard pages having one or two simple options per page, eliminating the need to navigate individual pages on the web interface. The residential gateway setup wizard may also confirm correct operation, utilize internal functions of the RG to diagnose problems, suggest solutions, and direct customers to appropriate user assistance resources.

Client PCs may have certain functional requirements. A driver for the supported network adapter may be installed. TCP/IP networking is installed, enabled, and tested for the network adapter. The client for networking is installed and enabled. File sharing is installed and enabled (such as Windows). Print sharing is installed and enabled and the user's printer is shared. A web connection sharing client capability is enabled. If the client connection is wireless, the wireless device is configured for secure access. Other client related software is installed. The user has assigned the BIOS or NETBIOS name and descriptive name. The user has specified whether web access is to be blocked for the client PC. A diagnostic has confirmed that the client installation has been successful and that the residential gateway is present.

The residential gateway may have certain function requirements. In one embodiment, the user must be able to configure the RG from a cabled or wireless client PC, the RG setup wizard must verify that it is communicating with the correct model and version of the RG before it attempts to configure it, each screen that displays user options must display the state of those options as currently configured on the RG not default values, and the user cannot run the RG setup wizard on a client PC unless the client PC setup wizard has successfully completed its client PC installation and setup on that PC. The present invention provides a function that a customer can user to automatically "clone" the complete WAN configuration of a PC that had previously been attached to a broadband modem, and is now behind a Residential Gateway. Certain current technologies require that the customer look at the WAN of the PC (e.g., DHCP—Dynamic Host Configuration Protocol—client settings, static IP address, DNS, host name, domain, etc.) and re-enter all of that into the web-based user interface on the Residential Gateway. The present invention is executable that runs on the PC, gathering the information, and automatically programming the Residential Gateway with the same values. Each ISP requires certain fields, while ignoring others, but there is no harm in copying all possible configuration parameters, and programming the Residential Gateway accordingly. That way, the customer doesn't have to know that, for instance, whether his or her ISP only needs the host name, or the host name and the domain name, or a particular IP address configuration, or the host name and the MAC address, or whatever.

All the various web related settings on the PC may be transferred to the residential gateway or the like through a single command or a single set of a handful of commands.

TCP (Transmission Control Protocol) related commands may be sent automatically through this method. The TCP/IP related commands may include domain name server (DNS) information such as domain, host name, DNS server search order, and domain suffix search order. Gateway related information such as whether this is a new gateway or if the gateway is already installed may be sent. WINS information, such as WINS server search order and scope ID, may be included. The IP address information may include the IP address and the subnet mask. NETBIOS information may be included. Advanced features such as allowing binding to ATM may be included. Bindings may be included.

Virtual Private Networking Adapter information may be sent, including connection reply timeout, disconnect reply timeout, and record a log file.

Dial-Up Adapter Properties may be included. These may be settings such as enable point to point (PPP) IP, IP packet size, record a log file, use IPX header compression, and drive type such as enhanced mode, real mode NDIS driver, and real mode ODI driver. PPP is used for phone modems. In PPP, Internet Protocol Configuration Protocol (IPCP) provides the IP address and network configuration information.

PC management information may be included. This may include information for standard such as 3COM EtherLink 10/100 PCI. Also included may be 802.1 p support, down poll rate, flow control, media type, NDIS driver version, Rx checksum offload, and Tx checksum offload.

Access control settings may be included such as share level and user level.

Client settings may also be included such as logon validation, quick logon, and logon and restore network connections.

FIG. 1 illustrates an embodiment of a residential gateway 10 of the present invention. The residential gateway is a rectangular enclosure that has jacks or plugs 20 to insert a cable from the individual PCs it manages. The residential gateway also may have a COM port 40 and a WAN port 30. A power cord outlet may be provided. Other features may include a reset button and other network ports. The residential gateway has a processor and a memory to route web traffic between the PCs and the network. The network need not be a WAN, but may be a local area network, a metropolitan area network, or some other type of network.

Figure 2:
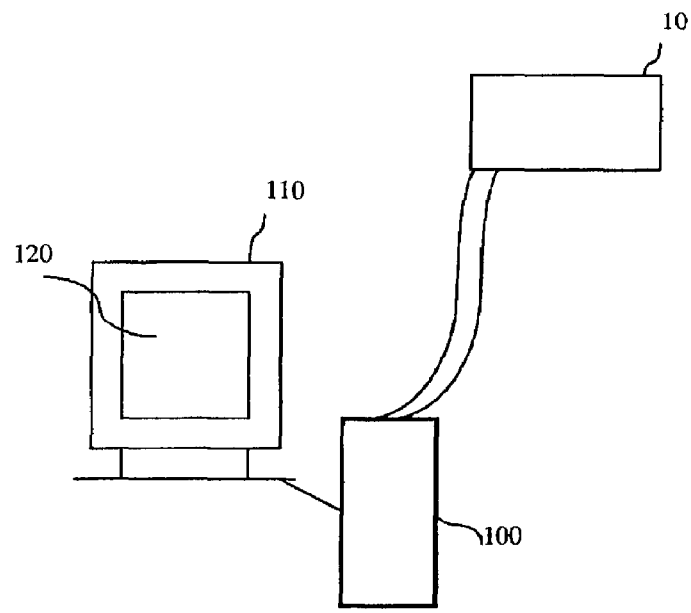
FIG. 2 illustrates a system which uses the present invention.

FIG. 2 illustrates a system which employs the present invention. A PC having a CPU 100 and a monitor 110 with a display screen 120 communicates to a network through the network switch 10. In one embodiment, the PC contains a broadband modem and the network switch does not.

Figure 3:
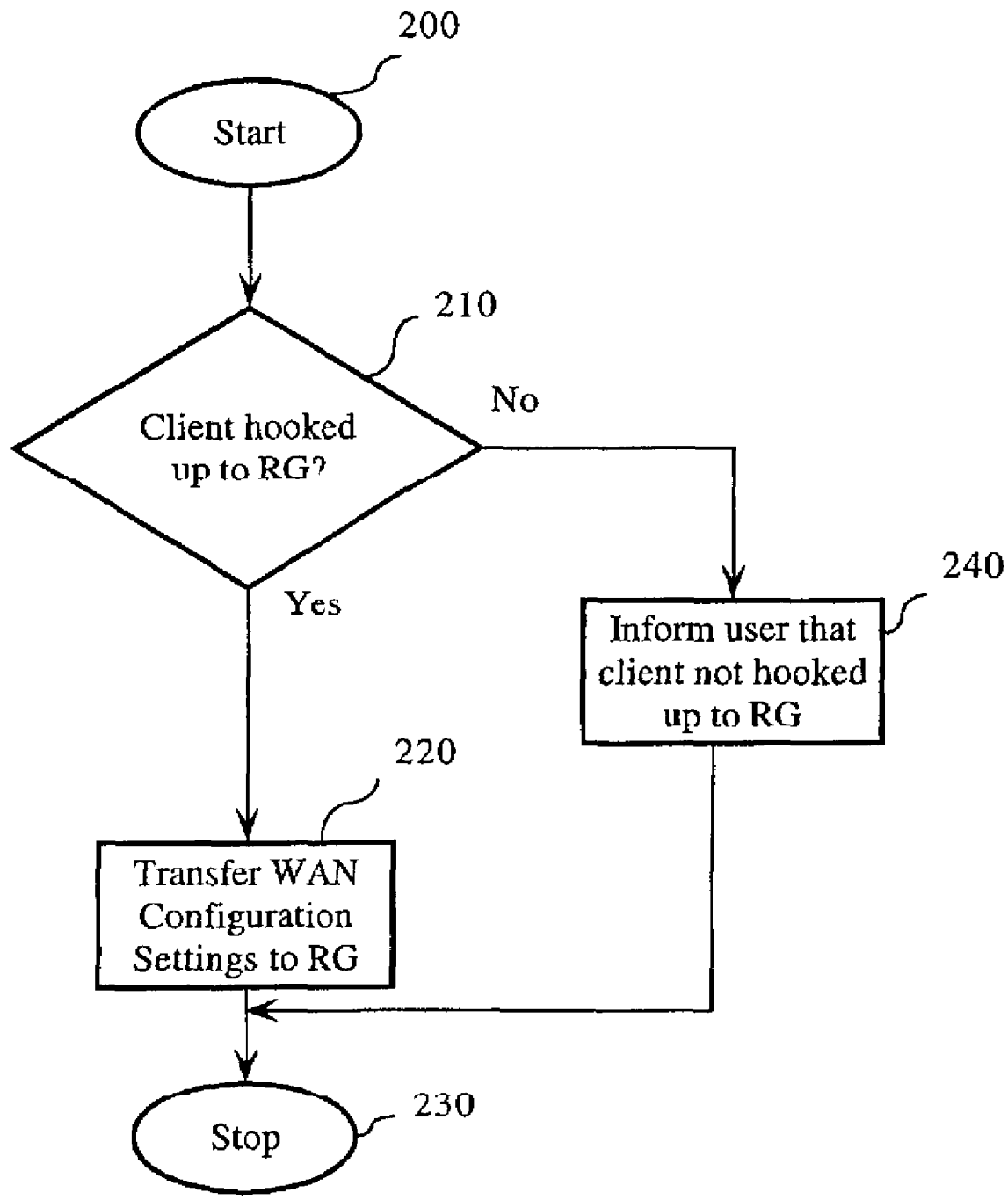
FIG. 3 illustrates a flow chart of the operations as seen in an embodiment from the perspective of a client device.

FIG. 3 illustrates a flow chart of the method showing the user's involvement in the process. The user may enter a single command or a single set of commands which are few in number. The maximum number of commands issued by the user may be one, two, three, five, or similar number. The routine is initiated through a user's prompt via a text data entry command (such as from DOS or a field presented on the graphical user interface), activation of an icon, or selection of an entry from a pull down menu or submenu, step 200. The method checks to see whether the client is connected to a residential gateway, step 210. If it is, then the WAN configuration or other network configuration settings are transferred to the residential gateway or like network switch, step 220. Otherwise, the user is informed that the client PC is not hooked up to the residential gateway, step 240.

Figure 4:
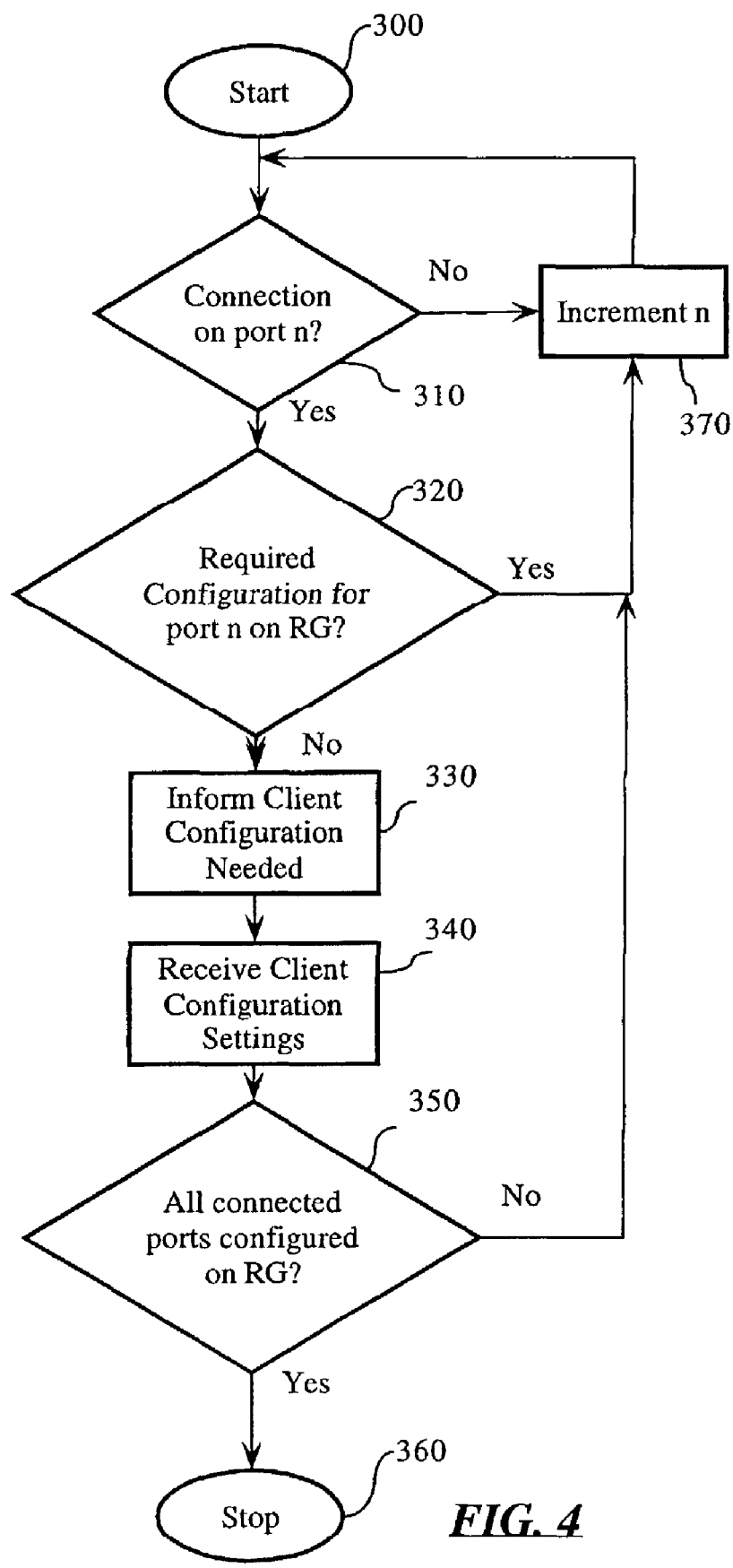
FIG. 4 illustrates a functional flow chart of an embodiment of the method of the present invention from the perspective of the residential gateway.

FIG. 4 illustrates an embodiment of the method as seen from the residential gateway or other network switch. The network switch may check for a connection from a PC on a port, step 310. If there is no connection detected, the network switch chooses the next port, step 370. The network switch may then check if the network configuration settings have been sent to it, step 320. If they have, the network switch chooses the next port. Otherwise, the client device or personal computer may be informed that the configuration settings have not been sent, step 330. In step 340, the network configuration settings are received from the personal computer. The network switch then determines if all ports have been configured, step 350.

The software which implements the method of FIG. 3 may reside on the personal computer only. The software which performs the method of FIG. 4 may reside on the residential gateway or network switch. Rebooting may be required after the method steps have been completed. The software may even permit extensive manual manipulation of the network configuration settings by the user as an option.

The present invention allows for default network settings on the network switch. The network switch may contain a flag bit which indicates whether the network configuration settings are default or supplied by the personal computer.

It is believed that the method of transporting a WAN configuration from a PC to a residential gateway of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for allowing a user to replace a direct connection of a client device adapted for network communications and having network configuration settings, with a connection through a network switch, comprising:

a client device having a monitor having a screen which is capable of displaying a graphical user interface, a processor, a memory coupled to the processor, and a computer program residing in the memory; and a network switch coupled to the client device, the network switch containing a software program which:

determines whether the network switch has already been configured; and if the network switch has not been configured, then generates and sends a query to the client device to transfer all the network configuration settings from the client device to the network switch through a single command, receives the requested configuration information from the client device, and configures the network switch with the configuration information received from the client device;

wherein the computer program of the client device gathers the network configuration settings of the client device and transfers the network configuration settings from the client device to the network switch in response to receiving the query generated by the network switch.

2. The system of claim 1, wherein the memory is a read only memory.

3. The system of claim 2, wherein the read only memory is an electrically erasable read only memory.

4. The system of claim 1, wherein the memory is a random access memory.

5. The system of claim 1, wherein the client device and the network switch communicate in a handshake mode.

6. The system of claim 1, wherein the network switch is a residential gateway which does not contain an integrated broadband modem.

7. The system of claim 1, wherein the client device is a personal computer.

8. A residential gateway for connecting one or more personal computers to a network, comprising:
   an enclosure;
   a processor within the enclosure;
   a memory within the enclosure coupled to the processor;
   one or more ports, communicatively linked to the processor and located on the enclosure, each of the one or more ports being adapted for connecting a single client device having network configuration settings to the residential gateway; and
   a network port, communicatively linked to the processor and located on the enclosure, for connecting to a network,
   wherein the residential gateway contains a software program which:
   determines whether there is a connection with a client device on one of said one or more ports;
   if there is a connection on the one port, then determines whether the one port has already been configured; and
   if the one port has not been configured, then queries the client device to transfer all the network configuration settings from the client device to the residential gateway through a single command, receives the reguested configuration information from the client device in response to the client device receiving the query and returning the requested configuration information, and configures the one port with the configuration information received from the client device.

9. The residential gateway of claim 8, wherein the one or more ports are four in number.

10. The residential gateway of claim 8, wherein the one or more ports are eight in number.

11. The residential gateway of claim 8, wherein the ports are wireless ports.

12. The residential gateway of claim 11, wherein the wireless ports are radio frequency ports.

13. The residential gateway of claim 11, wherein the wireless ports are infrared ports.

14. The residential gateway of claim 8, wherein the residential gateway contains no broadband modem.

* * * * *